Oct. 17, 1939.　　　F. J. MALONE　　　2,176,089
FIXTURE FOR MACHINE TOOLS
Filed Jan. 13, 1936　　　5 Sheets-Sheet 1

INVENTOR
Frank J. Malone
By Parker, Carlson, Pitzner & Hubbard
ATTORNEYS

Oct. 17, 1939.  F. J. MALONE  2,176,089
FIXTURE FOR MACHINE TOOLS
Filed Jan. 13, 1936    5 Sheets-Sheet 2

INVENTOR
Frank J. Malone
By Parker, Carlson, Pitzner & Hubbard
ATTORNEYS

Oct. 17, 1939.    F. J. MALONE    2,176,089
FIXTURE FOR MACHINE TOOLS
Filed Jan. 13, 1936    5 Sheets-Sheet 3
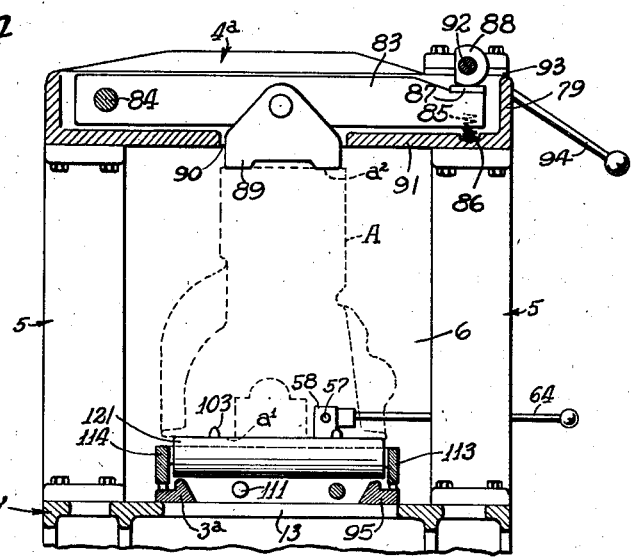
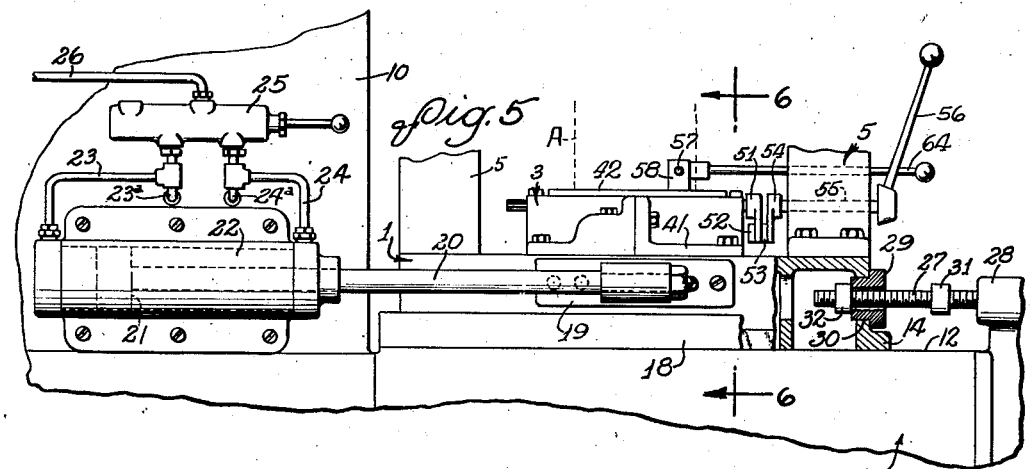
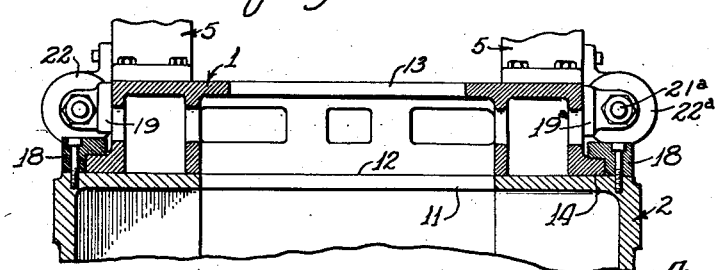
INVENTOR
Frank J. Malone
By Parker, Carlson, Pitzner & Hubbard
ATTORNEYS Oct. 17, 1939.  F. J. MALONE  2,176,089
FIXTURE FOR MACHINE TOOLS
Filed Jan. 13, 1936  5 Sheets-Sheet 4

INVENTOR
Frank J. Malone
By Parker, Carlson, Pitzner & Hubbard
ATTORNEYS

Oct. 17, 1939.  F. J. MALONE  2,176,089
FIXTURE FOR MACHINE TOOLS
Filed Jan. 13, 1936   5 Sheets-Sheet 5
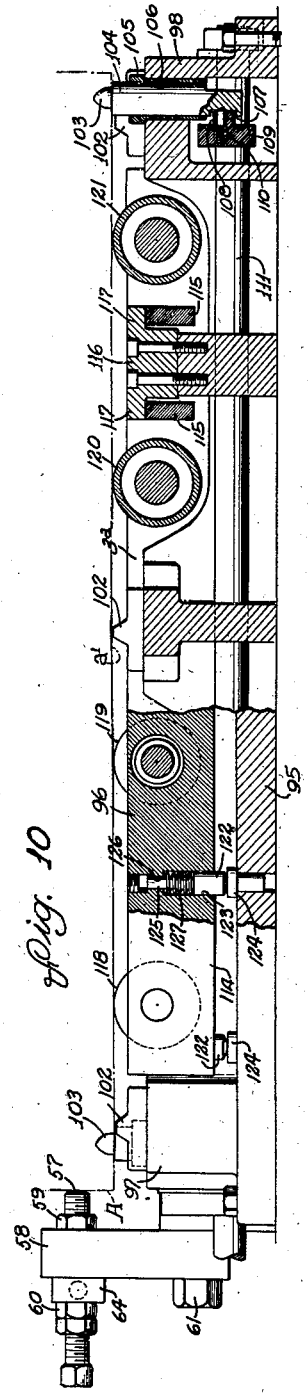
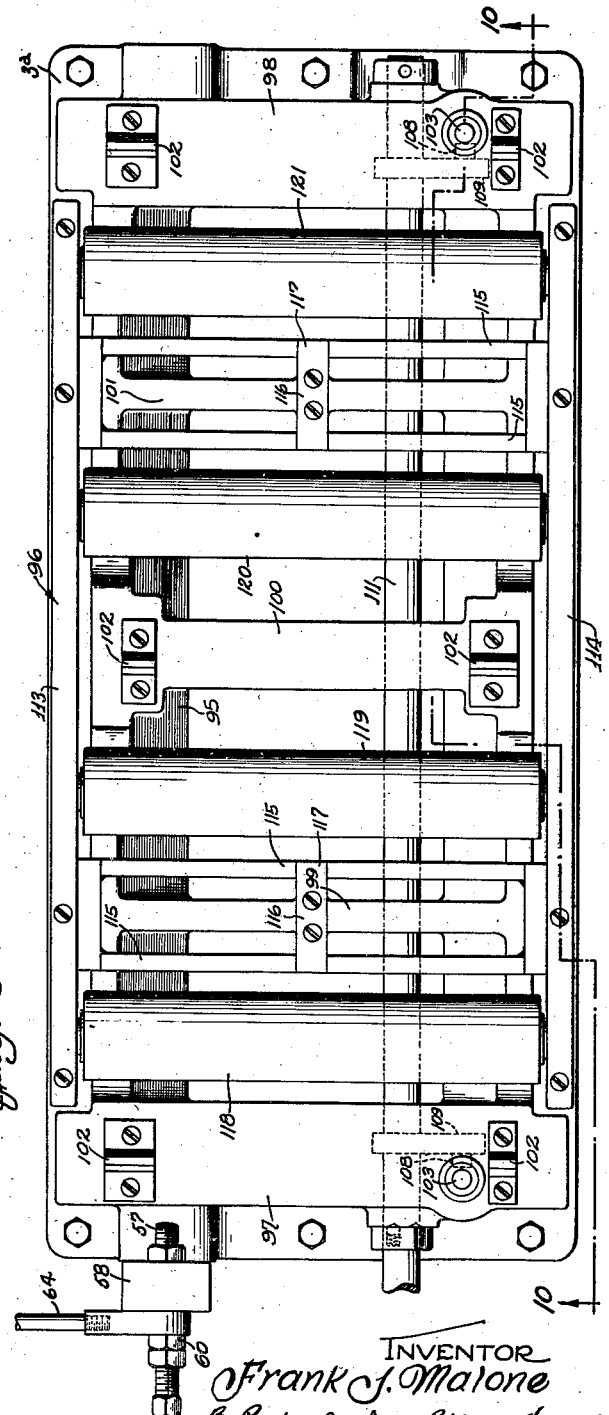
INVENTOR
Frank J. Malone
By Parker, Carlson, Pitzner & Hubbard
ATTORNEYS Patented Oct. 17, 1939

2,176,089

UNITED STATES PATENT OFFICE 2,176,089

FIXTURE FOR MACHINE TOOLS

Frank J. Malone, Canton, Ohio, assignor to The Ingersoll Milling Machine Company, Rockford, Ill., a corporation of Illinois Application January 13, 1936, Serial No. 58,841

17 Claims. (Cl. 90—61)

The invention relates generally to fixtures for machine tools, and particularly to fixtures adapted to support the work in proper relation to the tool.

Various objects of the present invention reside in the provision of a novel fixture which is built up from standardized separable parts adapted to be assembled selectively in different ways to permit conversion or adaptation of the fixture for different types, forms and sizes of work pieces, and for various kinds of machine operations to be performed thereon.

A more specific object is to provide a new and improved work fixture which is adaptable to clamp the work in an upright position either from the top or bottom or in an inclined position, and which may be converted to support the work in one fixed position or for indexing in different directions.

Other detailed objects reside in the provision in a work fixture of various novel means for facilitating loading of the work, for locating the work, for clamping the work in position, for indexing the work, and for keeping the locating surfaces free from chips.

Further objects and advantages will be apparent as the description proceeds.

In the accompanying drawings, Figure 1 is a perspective view showing various separable units adapted to be assembled to produce different forms of a fixture embodying the features of my invention.

Fig. 4 is a transverse vertical sectional view of a modified form of the work fixture in which the work piece is clamped from above.

Fig. 5 is a fragmentary side elevational view, partially in section, of the work fixture, and the machine tool with which it is associated.

Fig. 6 is a transverse vertical sectional view taken substantially along the line 6—6 of Fig. 5.

Fig. 9 is a plan view on an enlarged scale of the work supporting and locating unit embodied in the construction of Fig. 4.

Fig. 10 is a fragmentary view partially in section along line 10—10 of Fig. 9.

Referring more particularly to the drawings, the fixture, constituting the exemplary embodiment of the invention, is shown as of the type in which a work piece, such for example as an engine block A, is adapted to be clamped in position against a positioning surface. In the present instance, the work block A has two parallel faces $a^1$ and $a^2$, one of which is securely held against the positioning surface of the fixture by clamp means acting on the other.

A work fixture must be adapted to the character or type of the work piece, and the nature of the machine operation to be performed thereon. Since these factors vary widely, even for any one type of machine tool, it has been necessary in the past to provide large numbers of special fixtures. The cost of these fixtures in relation to that of the machine tool often is very high, and hence a heavy burden.

One of the primary features of the present invention resides in the provision of a work fixture which comprises a plurality of fundamental parts standardized according to certain basic functions, and adapted for selection and assembly in different ways, and therefore for conversion of the fixture, to accommodate singly any one of a substantial number of work pieces differing in type, form or size, or in the nature of the machine operation to be performed thereon.

Thus, engine blocks may differ in size or height. It may be desirable to clamp in some instances against the top surface, and in other instances against the bottom surface, of the block. Also, mounting of the block in different positions, for example, in a fully upright position or at an angle depending usually on the character of the machine operation, may be required. Relative angular disposition of the positioning or locating surface and the clamping means may be necessitated for work pieces having non-parallel controlling surfaces. The direction of loading or unloading may be in need of change. For example, it may be necessary in different instances to load either from the side or end of the fixture, and to unload in the same, different or reverse direction. Finally, indexing of the work piece may or may not be required. By reason of the separable character and standardization of the parts of the fixture, alteration or conversion of the fixture to adapt same to these and other variations in the condition of the work piece may be readily effected at a minimum cost and without requiring a large number of special designs.

Figure 1:
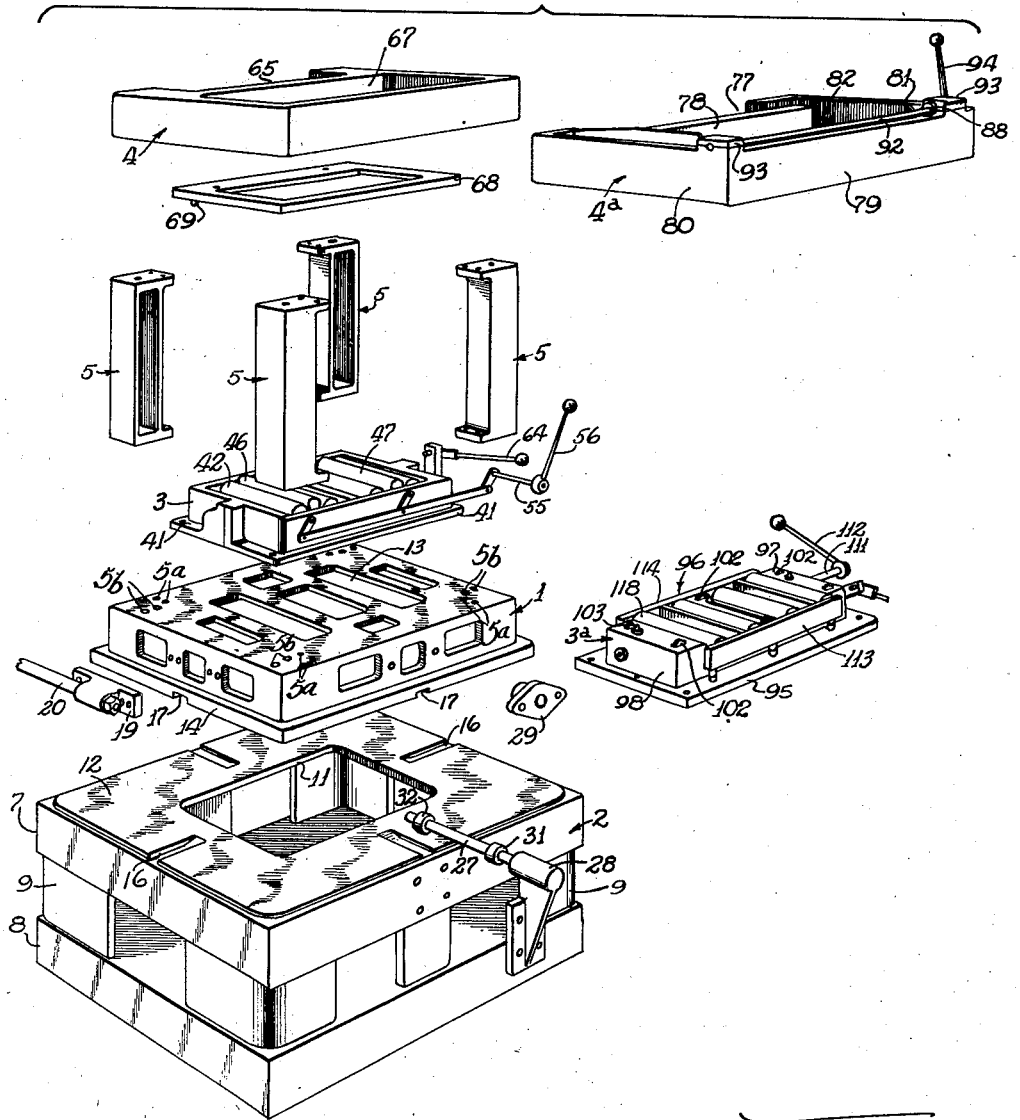

Referring particularly to Fig. 1, the fixture for the engine block A comprises a base member 1 adapted to be mounted upon a suitable support, such as a pedestal 2, a unit 3 or 3ᵃ adapted to be mounted on the base member 1 either in fixed position or for indexing movement in any one or a number of directions, and a spaced second unit 4 or 4ᵃ removably secured, as by means of detachable corner posts 5, to the first mentioned unit, and defining therewith a space 6 adapted to receive the engine block. One of the spaced units defines a positioning or locating surface, and the other is provided with suitable clamping means.

The pedestal 2 (see Figs. 1 and 2) preferably is upright, hollow and rectangular in form, and constructed of upper and lower horizontal sections 7 and 8 rigidly connected in parallel spaced relation at the corners by vertical angle-shaped posts 9. The four vertical sides of the pedestal 2 are machined for the selective attachment thereto of one or more supports or bed wings, such as the column 10 (see Fig. 5), forming part of the machine tool. A central opening 11 is formed in the top wall of the pedestal 2 to receive chips and other matter falling from the fixture. These chips may be removed from the pedestal 2 through the side openings between the corner posts 9. The top wall of the pedestal 2 also is formed with a flat horizontal surface 12 on which the base member 1 is adapted to be mounted.

The base member 1 (see Figs. 1, 2 and 6) is hollow, rectangular in form, open on the underside, and somewhat less in area than the mounting surface 12. Openings 13 are provided in the top and side walls for the reception of chips which may fall therefrom through the opening 11 into the pedestal 2. An external flange 14 is formed about the base member 1 along the lower margins of the vertical or side walls, and has a flat surface on its underside complemental to and adapted to seat slidably on the surface 12.

The flange 14 serves a two-fold purpose. Thus, when the fixture is to be secured in a fixed position, the flange 14 affords means adapted to be bolted to the pedestal 2. In this instance, the base member 1 is located and held in position by a plurality of transverse keys 15 (see Fig. 2) inserted in registering keyways 16 and 17 formed respectively in the surface 12 and the underside of the flange 14, and extending inwardly from each of the vertical walls of the pedestal 2. The keyways 16 and 17 are arranged, i. e., located centrally, so that they will register, with the base member 1 in different positions on the pedestal 2. Thus, the base member 1 may be demountably positioned crosswise of the machine as shown or longitudinally of the machine, and may be reversed end for end in either location.

When the fixture is to be mounted for indexing movement, the flange 14 is slidably confined on the pedestal 2 by means of parallel guide members 18 (see Fig. 6) removably bolted to the surface 12. It will be understood that the guide members 18 may engage any two parallel sections of the flange 14 to permit indexing of the fixture selectively along or transversely of the pedestal 2.

Suitable power means, preferably pneumatically operable, may be provided for indexing the fixture. With the guide members 18 extending longitudinally of the machine, a bracket 19 (see Fig. 5) is removably bolted to the front wall of the base member 1. A piston rod 20 is anchored at one end to the bracket 19, and at the other end is connected to a piston 21 slidably disposed in a cylinder 22 mounted on the side of the column 10. The ends of the cylinder 22 at opposite sides of the piston 21 are connected through pipe lines 23 and 24 to a manually operable reversing valve 25 having an inlet line 26 leading from a suitable source of fluid under pressure, such as compressed air. If desired, a similar pneumatic unit, comprising a cylinder 22ᵃ connected in parallel with the cylinder 22 by pipe lines 23ᵃ and 24ᵃ branching from the lines 23 and 24, may be mounted on the other side of the column 10, and connected by a piston rod 21ᵃ and bracket 19ᵃ to the rear wall of the base member 1.

Suitable means is provided for limiting the indexing movement so as to define predetermined index positions. In the present instance, this means is shown as comprising a non-rotatable screw 27 (see Figs. 1 and 5) which is anchored at one end to a bracket 28 removably bolted to one side wall of the pedestal 2, and which extends slidably through a bushing 29 in the direction of indexing movement. The bushing or sleeve 29 is removably bolted to one side wall of the base member 1, and projects into an opening 30 formed therein. Adjustably threaded on the screw 27 at opposite sides of the bushing 29 and for selective engagement therewith to limit the movement of the fixture in opposite directions are two stop nuts 31 and 32. It will be seen that by reversal of the valve 25, the fixture may be indexed selectively into either of two predetermined positions defined by engagement of the nuts 31 and 32 with opposite ends of the bushing 29. By adjusting the nuts 31 and 32 on the screw 27, the location and spacing of these positions may be varied.

Figure 7:
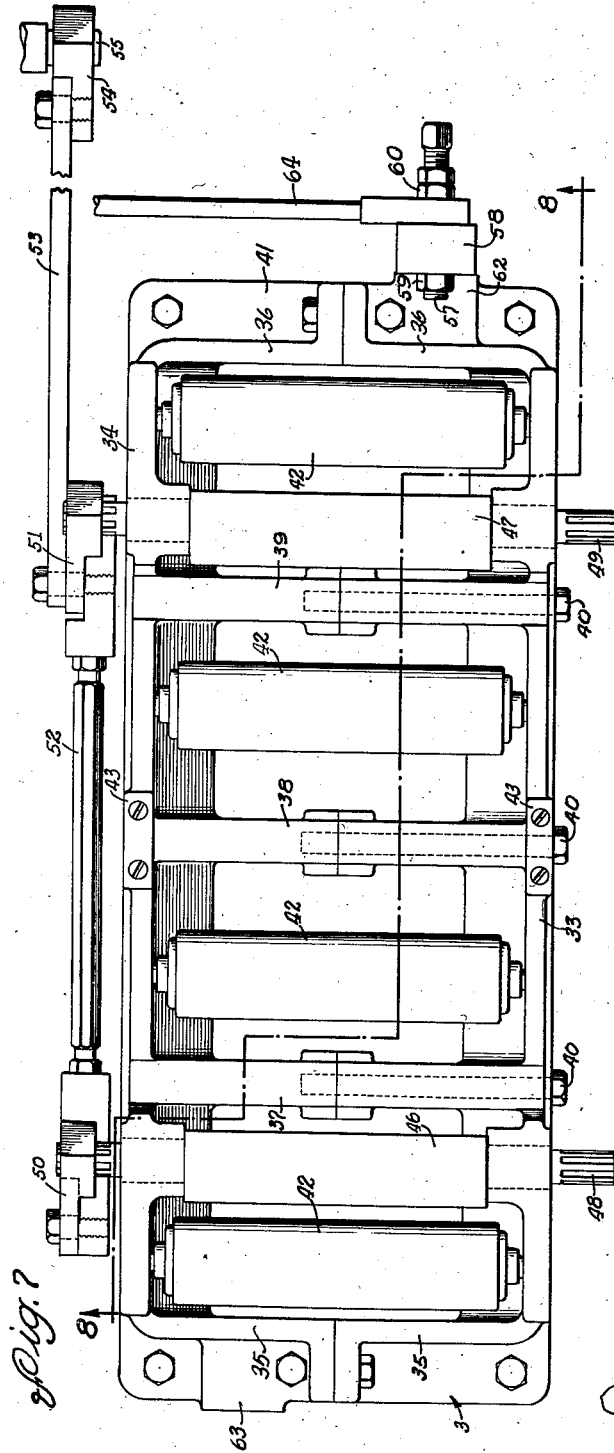
Fig. 7 is a plan view on an enlarged scale of the work clamping unit with the actuating parts shown in a different position than in Fig. 2.
Figure 8:
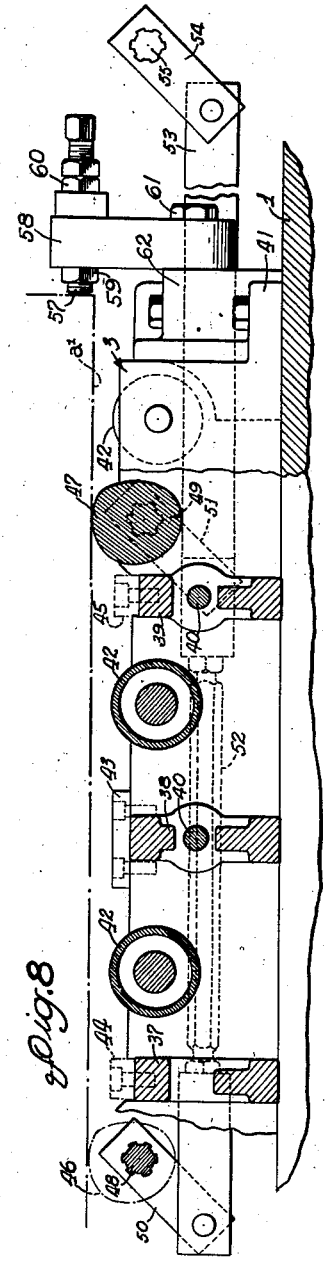
Fig. 8 is a longitudinal vertical sectional view taken substantially along line 8—8 of Fig. 7.

The top surface of the base member 1 is flat and machined to provide a mounting for the lower of the two units 3 and 4 or 3ᵃ and 4ᵃ between which the engine block A is adapted to be held. Referring to Figs. 7 and 8, the unit 3 is a clamping unit, and is formed of two longitudinal frame sections 33 and 34 having flanged end walls 35 and 36 and intermediate transverse webs 37, 38 and 39 secured together in end abutment by means of bolts 40 to define a unitary open-work rectangular structure. An external flange 41 is integral with and extends about the lower portion of the unit 3, and is mounted on and adapted to be removably bolted to the top surface of the base member 1.

The unit 3 is shown extending transversely of the machine. To facilitate loading and unloading of the work piece endwise of the unit 3, a plurality of rollers 42 are mounted respectively between and in parallel relation to the end walls 35 and 36 and webs 37, 38 and 39, and are freely journaled in the side walls of the frame sections 33 and 34. A skid block 43 is removably bolted to the top of the intermediate web 38, and is located in a slightly lower plane than the tops of the rollers 42. It will be understood that the work piece A may be inserted from the front, rear or either side, between the corner posts 5, and may be unloaded in the same, reverse or either perpendicular direction. When loading from the side of the unit 3 is desired, skid blocks 44 and 45 extending above the rollers 42 are removably bolted to the end webs 37 and 39. In this instance, the block 43 serves no useful purpose, and may be removed, if desired.

The unit 3 is provided with means for raising the work piece A, after loading, from the rollers 42 or the skid blocks 44 and 45, into clamping engagement with the underside of the locating unit 4. In its preferred form, this means comprises two elongated eccentrics 46 and 47 which extend parallel to and are located between the end rollers 42 and the end webs 37 and 39. The two eccentrics 46 and 47 are fixed respectively on rock shafts 48 and 49 journaled in and extending at both ends through the side walls of the frame members 33 and 34. The outer ends of the shafts 48 and 49 are splined for the detachable connection of parallel crank arms 50 and 51 interconnected at their free ends by a turnbuckle link 52 adjustable in length. One of the arms, namely the arm 51, is connected at its pivotal juncture with the link 52 to one end of a link 53. The other end of the link 53 is connected to a crank arm 54 on a rock shaft 55 which is suitably journaled in one of the corner posts 5, and which is provided with a hand lever 56. The clamp actuating mechanism just described may be secured to the rock shafts 48 and 49 at either side of the unit 3, for example, on the left hand side as shown in Fig. 7 or the right hand side as illustrated in Figs. 1 to 3 and 5.

Positioning means is available at will for locating the work piece A longitudinally on the unit 3 during loading and clamping. This means comprises a stop screw 57 (see Figs. 7 and 8) which extends through one end of an arm 58, and which is adapted to be secured in different positions of axial adjustment by means of a nut 59 and lock nuts 60 threaded thereon respectively at opposite sides of the arm. The other end of the arm 58 is mounted on a pivot pin 61 removably secured in either of two socket lugs 62 and 63 on opposite ends of the unit 3, depending on the direction of work loading. A manual actuator 64, in the form of a horizontally extending handle, may be secured on the screw 57 against the arm 58 by the lock nuts 60. Thus, the arm 58 may be swung from below the upper plane of the unit 3 upwardly to dispose the screw 57 in operative position for engagement by one end of the work piece A. When desired, as for example, to permit unloading, the arm 58 may be swung downwardly to lower the screw 57 out of the path of the work piece.

The upright posts 5 are removably bolted to the corners of the upper surface of the base member 1, and are rectangular in horizontal section and of greater width or thickness in one dimension than in the other. The bolt holes 5a and 5b are so arranged that the posts 5 may be secured in different angular positions so that the narrow sides or the wide sides thereof may be disposed at the ends of the unit 3, thereby permitting the most advantageous adaptation of the post spacing to the direction of work loading and unloading.

The upper or work locating unit 4 is in the form of a rectangular frame removably bolted at the corners to the tops of the posts 5. One side of the frame is recessed as indicated at 65 to receive the column 10 or other tool support, and thereby to reduce the overhang of the tool or tools 66 (see Fig. 2) to a minimum. The center of the frame is formed with an opening 67 through which the tools 66 may be projected for engagement with the work piece A.

The unit 4 constitutes a clamp back and work locating means. Removably secured to the underside of the unit 4 is a flat rectangular open frame plate 68 in registration with the opening 67 and having depending dowel pins 69 adapted to enter complemental locating recesses 70 in the surface $a^1$ of the work piece A. This surface is adapted to be clamped directly against the plate 68 or a hardened plate 71 disposed against the latter and through which the pins 69 project. In certain types of machine operations, such as drilling and reaming, the plate 68 is closed, and provided with guide bushings 72 for the tools 66 (see Fig. 2).

Figure 2:
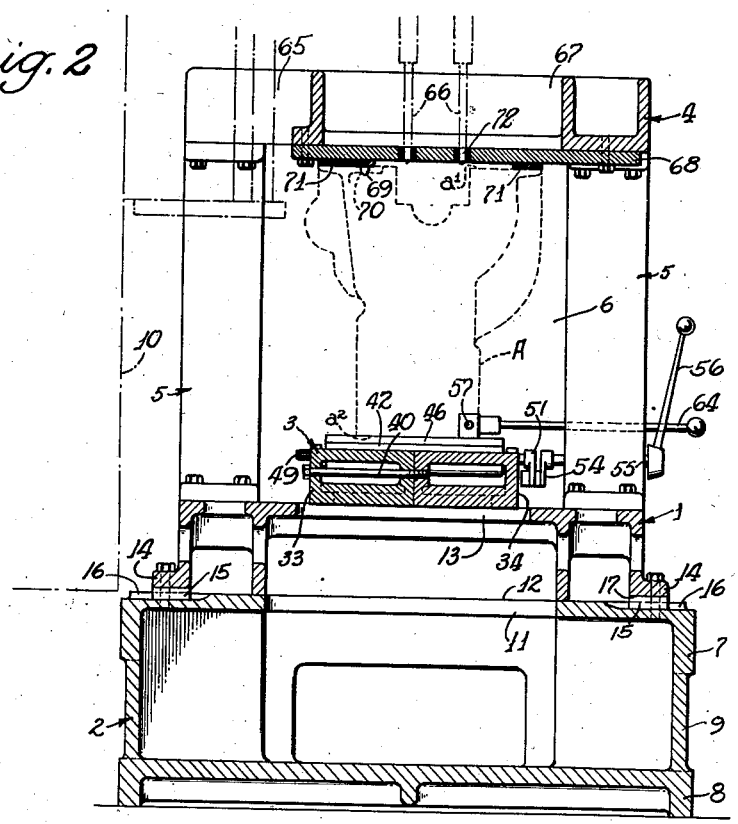
Figure 2 is a transverse vertical sectional view of the fixture adapted for supporting the work piece in upright position, and for clamping the work piece from below.
Figure 3:
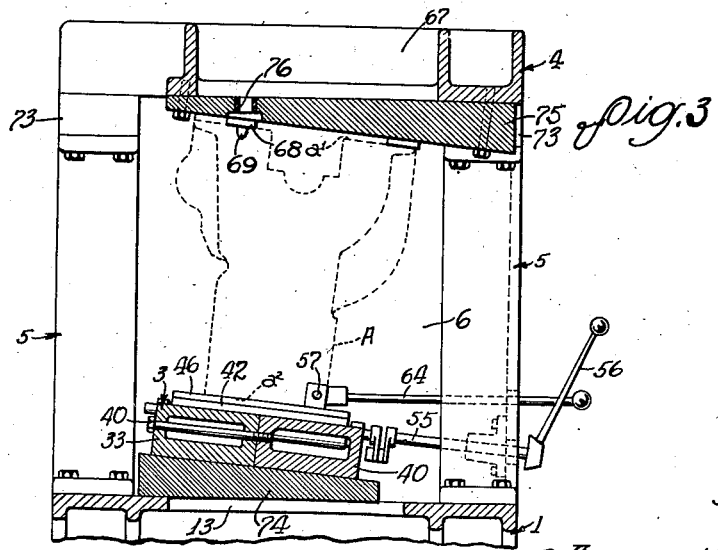
Figure 3 is a fragmentary sectional view generally similar to Fig. 2, but showing means for supporting the work piece at an angle to the vertical.

By making the dowel unit 4 separable from the posts 5, it is possible to adapt the fixture for work pieces of different heights without requiring the use of substitute parts. Thus, vertical spacer blocks 73 may be removably inserted between the unit 4 and the upper ends of the posts 5. This convertibility also permits a change in the mounting of a given work piece from a fully upright position as indicated in Fig. 2 to an inclined position as shown in Fig. 3. By inclining the work piece A in this manner, machine operations may be performed at an angle without necssitating adjustment of the tools 66 or their path of travel.

For mounting the work piece A in an inclined position, an angle spacer 74 is interposed between the base member 1 and the unit 3, the parts being removably bolted together. Likewise, an angle spacer 75, having a bottom surface parallel to the top surface of the spacer 74, is removably bolted to the underside of the unit 4, and has the dowel plate 68 removably bolted thereto. One or more vertical guide bushings 76 may be mounted in and open through the spacer 75. By using only one of the spacers 74 and 75, the fixture may be adapted for coaction with non-parallel surfaces.

Work pieces, such as the engine block A, are usually provided in one surface with locating means, such as the recesses 70, to receive the dowel pins 69. In such instances, it is desirable to apply the clamping pressure against a surface on an opposite side or end of the work piece. Thus, in Figs. 2 to 8, the work piece A is clamped from below. When the work piece A is inverted to permit machining operations from above on the surface $a^2$, the recesses 70 are located in the underside, and in this instance the units 3a and 4a are substituted for the units 3 and 4 to permit clamping from above.

The unit 4a is similar in shape to the unit 4, i. e., comprises an open rectangular frame adapted to be removably bolted at the corners to the tops of the posts 5, and recessed at 77 to receive the column 10 or other tool support. The frame comprises side and end walls 78 to 81 defining a central opening 82 through which the tools 66 may be projected for engagement with the work piece A.

Suitable clamping means for engaging the top surface $a^2$ of the work piece A is mounted in the unit 4a, and in its preferred form comprises a transverse bar or lever 83 (see Fig. 4) mounted for swinging movement at one end on a shaft or rod 84 secured in the end walls 80 and 81. The other end of the bar 83 is yieldably supported by a releasing compression spring 85 seated in a recess 86 in the wall 91, and is provided on the top with a hardened plate 87 engaging a rotary clamping cam or eccentric 88. A clamping shoe 89 is pivotally mounted on an intermediate portion of the bar 83, and depends through an opening 90 in a web 91 for self-aligning engagement with the top surface of the work piece A. The cam 88 is fixed on a rock shaft 92 which is journaled in upstanding lugs 93 on the ends of the wall 79, and which is provided at one end with a manual operating lever 94.

The unit 3ª (see Figs. 9 and 10) has a stationary sub-frame 95 and a movable work support 96 mounted thereon. The sub-frame 95 is in the form of an open-work rectangular externally flanged structure adapted to be bolted to the base member 1, and having end walls 97 and 98 and intermediate transverse webs 99, 100 and 101. Suitable work locating projections 102 are mounted on the top of the sub-frame 95 at the ends of the end walls 97 and 98 and the central transverse web 100. Two retractible dowel pins 103, for engaging in the recesses 70 in the work piece A, are also mounted in the end walls 97 and 98 of the sub-frame 95. The dowell pins 103 are alike in construction, and hence a description of one will suffice for both. Each pin 103 is formed on the upper end of a vertical plunger 104 which is slidably disposed in a sleeve 105 seated in an opening 106 in the end of the sub-frame 95. The lower end of the plunger 104 is formed on one side with a transverse notch or recess 107 receiving a pin 108 on the free end of a substantially horizontal rocker arm 109. A spring-pressed detent 110 is mounted in the arm 109, and extends from the end of the pin 108 into interfitting engagement with the bottom of the recess 107.

The rocker arms 109 for the two pins 103 are fixed on a rock shaft 111 which is journaled at opposite ends in the opposed walls 97 and 98, and which is provided with an actuating lever 112.

The work support 96 comprises side walls 113 and 114 which extends along the outside of the sub-frame 95, and which are rigidly connected by a plurality of transverse tie bars 115. Preferably, two bars 115 are provided respectively at opposite sides of each of the transverse webs 99 and 101. Two caps 116 are removably bolted to the tops of the intermediate portions of the webs 99 and 101, and have end lugs or flanges 117 projecting over the tie bars 115 to confine the support 96 loosely on the sub-frame 95.

A plurality of rollers 118 to 121 are journaled at their ends in the side walls 113 and 114, and extend in parallel relation respectively between the end walls and transverse webs 97 to 101.

The support 96 normally is urged upwardly against the lugs 117 to position the rollers 118 to 121 in a plane above the locating projections 102 and also above the dowel pins 103 when the latter are retracted, thereby avoiding interference when loading the work piece A into the fixture. In the preferred form, a plurality of vertical plungers 122 are slidably mounted in longitudinally spaced relation in a like number of bores 123 formed in and opening to the undersides of the walls 113 and 114, and engage hardened plates 124 on the external mounting flange of the sub-frame 95. Preferably, each plate 124 is in the form of a headed pin removably seated in a bore in the flange. Each plunger 122 has a stem 125 extending slidably through a guide bore 126 at the upper end of the bore 123. A coiled compression spring 127, encircling the stem 125, is seated against the inner end of the bore 123 and engages the plunger 122 to urge the latter upwardly. Hence, the plungers 122 through coaction with the underlying plates 124 tend to lift the support 96 upwardly.

It is contemplated that springs 127 will readily overcome the weight of the work piece when the latter is unclamped and that in the elevated position of the rollers 118 to 121, as determined by the flanges 117, the uppermost parts of the rollers will be disposed only a few thousandths of an inch above the surfaces of the locating projections 102. Thus, as the work piece is slid along the rollers into operating position as shown in Fig. 10, the bottom surface $a^1$ will be disposed so close to the projections 102 that any chips remaining on the locating surfaces from the previous operation will be scraped off effectually automatically and the locating surfaces left clean.

As in the case of the unit 3, a positioning means is provided for locating the work piece A longitudinally during loading and initial clamping. The positioning means is the same as shown in Figs. 7 and 8, and the corresponding parts therefore are identified by the same reference characters.

The operation and convertibility of the fixture will be understood from the foregoing description. Briefly, when indexing is not desired, the base member 1 may be rigidly bolted to the pedestal 2. When indexing is desired, parallel sections of the flange 14 at opposite sides or at opposite ends of the base member 1 may be slidably disposed between the guide members 18.

The posts 5 may be oriented angularly, i. e., with the widest sides facing either the sides or the ends of the frame member 1, to obtain a spacing most convenient for any particular manner of loading and unloading.

When the work piece A is to be clamped from below, the units 3 and 4 are employed. If the work piece is to be loaded from the end, the skid plates 44 and 45 are removed, and if the work piece is to be loaded from the side, the skid plates 44 and 45 are bolted to the webs 37 and 39. In loading the fixture, the eccentric rollers 42 are rotated into inoperative position, and the work piece is inserted into position either on the rollers 42 or the skid plates 44 and 45. The work piece then is moved into end abutment with the screw 57 and positioned laterally to locate the recesses 70 approximately in line with the dowel pins 69. Thereupon, the eccentric rollers 46 and 47 are rotated into the position illustrated in Fig. 8 to lift the work piece A into engagement with the dowel plate 68 or the hardened plate 71 if the latter is used.

The locating stop 57 may be swung out of operative position to facilitate insertion or removal of the work. It will also be understood that the arm 58 may be mounted on either end of the unit 3 and that the mechanism for rotating the eccentrics 46 and 47 may be attached to either ends of the shafts 48 and 49.

For certain types of work, the dowel plate 68 may be closed and provided with guide bushings 72 as illustrated in Fig. 2. Spacer blocks 73 may be utilized to increase the length of the posts 5, either to adapt the fixture for work pieces of different heights or to provide extra height for insertion of the spacers 74 and 75. These spacers permit clamping the work piece in an inclined position as illustrated in Fig. 3. If only one spacer is used, non-parallel surfaces on the work may be clamped against the units 3 and 4.

In the fixture as shown in Figs. 4, 9 and 10, the work piece is clamped from below. In loading the fixture, the dowel pins 103 initially are retracted. Then the work piece A is inserted into position on the rollers 118 to 121 and located against the stop screw 57. The pins 103 now are projected upwardly into the recesses 70. Then, the shaft 111 is rocked to force the shoe 89 downwardly against the upper surface $a^2$ of the work piece A. The clamping action depresses the support 96 and holds the work piece A in accurately located position against the projections 102.

I claim as my invention:

1. A fixture comprising, in combination with a support having a flat rectangular horizontal mounting surface on the top, spaced parallel guide members fashioned for rigid juncture with said surface in any one of a plurality of different angular positions, a base member slidably confined by said guide members for rectilinear indexing movement on said surface, and holding means on said base member.

2. A fixture comprising, in combination with a support having a mounting surface on the top, spaced guide members fashioned for rigid juncture with said surface in any one of a plurality of different angular positions, a base member slidably confined by said guide members for indexing movement on said surface, and holding means on said base member.

3. A fixture comprising, in combination with a support having a mounting surface on the top, spaced parallel guide members on said surface, a rectangular base member having external guide flanges adapted to be mounted interchangeably in any one of a plurality of angular positions between said guide members for rectilinear translation on said surface, and holding means on said base member.

4. A fixture having, in combination, a pedestal having a rectangular top surface, a box-like fixture frame supported upon said pedestal and having a base member rigidly attached to said surface, and upwardly facing shoulders along each side of said base member to which shoulders guide members may be applied to secure said frame to said pedestal for horizontal sliding movement in either of two transverse directions.

5. A work fixture having, in combination, a rigid box-like frame structure having top and bottom walls and a plurality of spaced rigid upright supports between which a work piece may be slid, a member having a surface against which a work piece may be pressed to locate the work piece in position to be machined, a second member having a movable clamping element thereon with a surface adapted to engage the work piece, one of said members being secured to said top wall and the other to said bottom wall with said surfaces in opposed relation and said members being detachable from said walls to permit the interposition of angular spacer elements between the walls and members whereby to change the angle at which the work piece is disposed.

6. A work fixture having, in combination, a pedestal, a structurally separate base plate detachably mounted upon said pedestal, structurally separate upright supports upstanding from and rigidly attached to said plate, a top plate rigidly joining the upper ends of said upright supports, and structurally separate members detachably secured in spaced relation to the opposed surfaces of said plates, work-locating means on one of said members, and means movably mounted on the other member and operable to press a work piece against said locating means.

7. A work fixture having, in combination, a pedestal, a structurally separate base plate detachably mounted upon said pedestal, structurally separate upright supports upstanding from and rigidly attached to said plate, a top plate rigidly joining the upper ends of said upright supports, and structurally separate members detachably secured in spaced relation to the opposed surfaces of said plates, work-locating means on one of said plates, means movably mounted on the other plate and operable to press a work piece against said locating means, and a structurally separate angularly shaped spacer elements interposed between said plates and members and determining the angle in which said work piece is disposed when clamped in working position.

8. A fixture comprising, in combination, a base member having a mounting surface, a plurality of spaced upright supports extending perpendicularly from said surface, a holding unit on said surface, a second holding unit removably supported by the outer ends of said upright supports, spacer blocks removably inserted between said second unit and the outer ends of said upright supports, and clamping means on one of said units for holding work against the other of said units.

9. A fixture comprising, in combination, a base member having a mounting surface, a plurality of spaced upright supports extending perpendicularly from said surface, a holding unit on said surface, a second holding unit removably supported by the outer ends of said upright supports in parallel spaced relation to said first mentioned unit, clamping means on one of said units for holding work against the other of said units, and an angle block removably mounted on the inside of said second unit.

10. A fixture comprising, in combination, a base member having a mounting surface, a plurality of spaced upright supports extending perpendicularly from said surface, a holding unit removably mounted on said surface, a second holding unit supported by the outer ends of said upright supports, clamping means on one of said units for holding work against the other of said units, and an angle block removably secured between said member and said first mentioned holding unit.

11. A fixture comprising, in combination, a base member having a mounting surface, a plurality of spaced upright supports extending perpendicularly from said surface, a holding unit removably mounted on said surface, a second holding unit removably supported by the outer ends of said upright supports, clamping means on one of said units for holding work against the other of said units, an angle block removably secured between said member and said first mentioned holding unit, and an angle block removably mounted on the inside of said second unit.

12. A work fixture having, in combination, a rigid box-like frame structure having top and bottom walls connected by rigid vertical members with at least two adjacent open side walls through which a work piece may be slid in a selected direction of loading, work-locating and work-clamping members, means for interchangeably and removably securing one of said members to said top wall and another of said members to said bottom wall in opposed relation and in alinement with a selected one of said open side walls, clamping means on said clamping member adapted to press a work piece against said locating member, and rollers mounted on the lower of said members for slidably supporting a work piece during the insertion thereof into the fixture.

13. A work fixture having, in combination, a rigid box-like frame structure having top and bottom walls connected by rigid vertical members with at least one open side wall through which a work piece may be slid, work-locating and work-clamping members, means for interchangeably and removably securing one of said members to said top wall and the other to said bottom wall in opposed relation and in alinement with said open side wall, clamping means on said clamping member adapted to press a work piece against said locating member, and rollers mounted on the lower of said members for slidably supporting a work piece during the insertion thereof into the fixture.

14. A work fixture having, in combination, a rigid box-like frame structure having top and bottom walls connected by rigid vertical members with at least two open side walls through which a work piece may be slid for a selected direction of loading, work-locating and work-clamping members, means for interchangeably and removably securing one of said members to said top wall and the other to said bottom wall in opposed relation and in alinement with a selected one of said open side walls, and clamping means on said clamping member adapted to press a work piece against said locating member.

15. A work fixture comprising, in combination, a rigid box-like frame structure having top and bottom walls connected by rigid upright supports, the opposed surfaces of said top and bottom walls being fashioned for the attachment of work-locating and work-clamping members thereto in a plurality of angularly spaced positions to accommodate the insertion of a work piece into the fixture from a selected side thereof, and work-locating and work-clamping members each having a supporting face fashioned for rigid juncture with one of said walls in a selected angular position.

16. In a work fixture adapted to be assembled from standardized structurally separate parts or units for the accommodation of different types of work pieces or machining operations, the combination of, a base, a plurality of rigid supports, means for detachably securing selected ones of said supports to said base in spaced relation to each other and projecting therefrom, a work-locating member, a work-clamping member, and means for interchangeably securing one or the other of said members to the projecting portions of said supports and the remaining one of said members to said base and in opposed relation to each other for the reception of a work piece therebetween, whereby said work-locating and work-clamping members may be interchangeably mounted with one or the other adjacent the base and spaced apart from each other a desired distance corresponding to the lengths of the supports selected.

17. In a work fixture adapted to be assembled from standardized structurally separate parts or units for the accommodation of different types of work pieces or machining operations, the combination of, a base, a plurality of rigid supports, means for detachably securing selected ones of said supports to said base in spaced relation to each other and projecting therefrom, a work-locating member, a work-clamping member, and means for interchangeably securing one or the other of said members to the projecting portions of said supports and the remaining one of said members to said base and in opposed relation to each other for the reception of a work piece therebetween, said last named means being adapted to secure said members in any selected one of a plurality of angular positions on said base and supports to accommodate the loading of work pieces in a corresponding selected direction.

FRANK J. MALONE.